United States Patent [19]

Iwasaki et al.

[11] Patent Number: 5,589,426

[45] Date of Patent: Dec. 31, 1996

[54] MONOLITHIC REFRACTORIES

[75] Inventors: Itsutoshi Iwasaki; Tatsuo Yamasaki; Hideaki Sawada, all of Fukuoka-ken, Japan

[73] Assignee: Taikorozai Co., Ltd., Fukuoka-ken, Japan

[21] Appl. No.: 89,677

[22] Filed: Jul. 9, 1993

[30] Foreign Application Priority Data

Jul. 14, 1992 [JP] Japan .................................. 4-209743

[51] Int. Cl.$^6$ .................................................. C04B 35/66
[52] U.S. Cl. ........................... 501/32; 501/89; 501/94; 501/127
[58] Field of Search .................. 501/94, 32, 89, 501/127, 109

[56] References Cited

U.S. PATENT DOCUMENTS

| | | | |
|---|---|---|---|
| 2,322,179 | 6/1943 | Van Zwet | 501/109 X |
| 3,357,843 | 12/1967 | Bowman | 501/127 X |
| 3,547,670 | 12/1970 | Fuchs et al. | 501/127 X |
| 3,649,313 | 3/1972 | Fisher | 501/127 X |
| 4,174,331 | 11/1979 | Myles | 501/95 |
| 4,221,596 | 9/1980 | Rice | 501/128 |
| 4,699,661 | 10/1987 | Yamamoto et al. | 501/109 X |
| 4,952,534 | 8/1990 | Davis et al. | 501/94 |
| 5,073,525 | 12/1991 | Chenu et al. | 501/81 |
| 5,302,563 | 4/1994 | Rumpletin et al. | 501/111 |

FOREIGN PATENT DOCUMENTS

| | | | |
|---|---|---|---|
| 0045867 | 4/1981 | Japan | 501/94 |
| 0232975 | 12/1984 | Japan | 501/94 |

Primary Examiner—Mark L. Bell
Assistant Examiner—David Sample
Attorney, Agent, or Firm—John F. A. Earley; John F. A. Earley, III

[57] ABSTRACT

This invention provides monolithic refractories comprising 100% by weight of refractory aggregate powders, and in addition thereto, based on the weight of refractory aggregate powers, 0.05 to 5% by weight of a binder which is phosphate glass and/or hydroxycarboxylates and 0.01 to 1% by weight of a thickener, characterized in that said monolithic refractories have been kneaded with water or other kneading liquid. The monolithic refractories are capable of being applied without being kneaded at working sites.

1 Claim, 1 Drawing Sheet

MONOLITHIC REFRACTORIES

TECHNICAL FIELD

This invention relates to monolithic refractories which are used as wall lining for different kinds of blast furnaces, molten steel vessels, etc., and more specifically, it relates to monolithic refractories which are used as pouring materials of premix type, and which do not need water or other kneading liquid at working sites.

PRIOR ART

Monolithic refractories are divided into pouring materials generally called castables, ramming materials, vibration forming materials, spraying materials, etc. according to how they are applied.

As to pouring materials, the pouring materials can be shaped as being poured into molds, after they have been mixed with water or other kneading liquid at working sites. The pouring materials have excellent workability. However, they have many problems such as troublesome mixing work, difficulties in maintaining constant water content, etc..

Ramming materials and vibration forming materials can be applied without being kneaded with water or other kneading liquid. However, they do not have the same workability and fluidity as the pouring materials.

Spraying materials can be applied as being sprayed in dry or wet state by means of spray guns. However, the spraying materials are not poured into molds, and accordingly, respective products are not uniform in quality, as compared with products of the pouring materials. Thus, the spraying materials are mainly used in repairs.

Up to the present, monolithic refractories which have workability, and which are capable of being poured into molds without being kneaded with water or other kneading liquid at working sites are hardly seen on the market.

Recently, it has become a very important problem for enterprises to secure labour, while they keep a good working environment so that workmen may work comfortably. For the sake of this, both simplification of work and labor saving are more and more demanded in refractory enterprises which do not have a good labor environment. The same is demanded in sites of construction in which pouring materials are to be used. Namely, pouring materials capable of being applied more easily and more simply are strongly demanded.

SUMMARY OF THE INVENTION

An object of the present invention is to provide monolithic refractories which are pouring materials of premix type, which are capable of being used without being kneaded at working sites, which may meet the foregoing needs of working sites, and which may solve the following problems which conventional pouring materials had.

Dust rose when pouring materials were being prepared. It was troublesome to prepare pouring materials, because the amount of water to be added varied according to respective pouring materials, and because the amount of water had to be adjusted. The amount of added water varied artificially. It took much time to obtain pouring materials having appropriate workability. When pouring materials were shipped in a state of premixed type, that is, in a state of water having been mixed, it was difficult to preserve the pouring materials, and it was impossible to control hardening of the pouring materials, and when the pouring materials were transported, unfavorable effects such as segregation of grain size and separation of liquid phase occurred.

As a result of various studies, the present inventors have succeeded in production of monolithic refractories which are pouring materials of premix type, and which comprise refractory aggregate powders, a binder which is phosphate glass or hydroxycarboxylates and a thickener. Thus, the inventors have settled the above-mentioned problems.

Namely, the present invention provides monolithic refractories comprising 100% by weight of refractory aggregate powders, and in addition thereto, based on the weight of said powders, 0.05 to 5% by weight of a binder selected from the group which consists of phosphate glass mainly composed on $P_2O_5$-$Al_2O_3$-$Na_2O$-$K_2O$, and hydroxycarboxylates, and combinations of the phosphate glass and oxycarbonate; and 0.01 to 1% by weight of a thickener, characterized in that said monolithic refractories have been kneaded with water or other kneading liquid.

In the present invention, electrically fused alumina, chamotte, bauxite, sintered alumina, spinel, silicon carbide, carbon, etc. can be used as refractory aggregate powders, but it is a matter of course that other refractory aggregate powders can be used in the present invention.

In the present invention a binder is used for the purpose of introduction of thermosetting property and strength at low temperature. As the binder, phosphate glass or hydroxycarboxylates can be used, and also phosphate glass and hydroxycarboxylates can be used together. Phosphate glass is insoluble in water and is mainly composed of $P_2O_5$-$Al_2O_3$-$Na_2O$-$K_2O$, the composition of which is 45–68% by weight of $P_2O_5$, 5–18% by weight of $Al_2O_3$ and 19–28% by weight of Na2O and K2O. Deviation from the range of the composition causes solubility in water to become strong so that the effect of the binder may not be displayed.

As hydroxycarboxylates to be employed in the present invention, glycolate, tartrate, lactate, citrate, etc. , the metal of which is lithium, sodium, potassium or aluminum, can be used. The total amount of the binder to be added is 0.05 to 5% by weight. The amount of less than 0.05% by weight of the binder may make the thermosetting property bad, so that initial strength becomes insufficient, and accordingly, it takes much time until molds can be removed. Also, the amount of more than 5% by weight of the binder may cause the pouring materials to be expanded or exploded with water vapour when being dried. The above-mentioned is the reason why the amount of the binder is limited in the range of 0.05 to 5% by weight. The detail of the mechanism involved has not been made clear, but it has been found that heating of pouring materials at 80° C. or more than 80° C. enables the pouring materials to be hardened and enables the molds to be easily removed. Furthermore, it has been found that the pouring materials have proper permeability and do not have bond migration, and accordingly, the pouring materials are safe against water vapour explosion.

As to the thickener used together with the binder in the present invention, the thickener plays an important role in preventing segregation of grain size and separation of liquid phase, when the pouring materials are transported. Furthermore, the thickener is expected to have an effect as an auxiliary binding agent. As the thickener to be employed in the present invention, all additives which are used for foods, public works and construction works can be used. However, as a result of various tests, it has been found that a cellulose compound or a copolymer of maleic anhydride and isobutylene gives a good effect. The thickener is used within the range of 0.01–1% by weight. The amount of less than 0.01% by weight makes the thickening ability too weak to prevent the segregation of grain size of the pouring materials when being transported. The amount of more than 1% by weight of the thickener causes workability or fluidity to be reduced, and as a result, hardening becomes insufficient and safety against dry explosion is lowered.

BRIEF DESCRIPTION OF THE DRAWINGS

Now, the accompanying drawing is explained.

EXAMPLES

Figure 1:
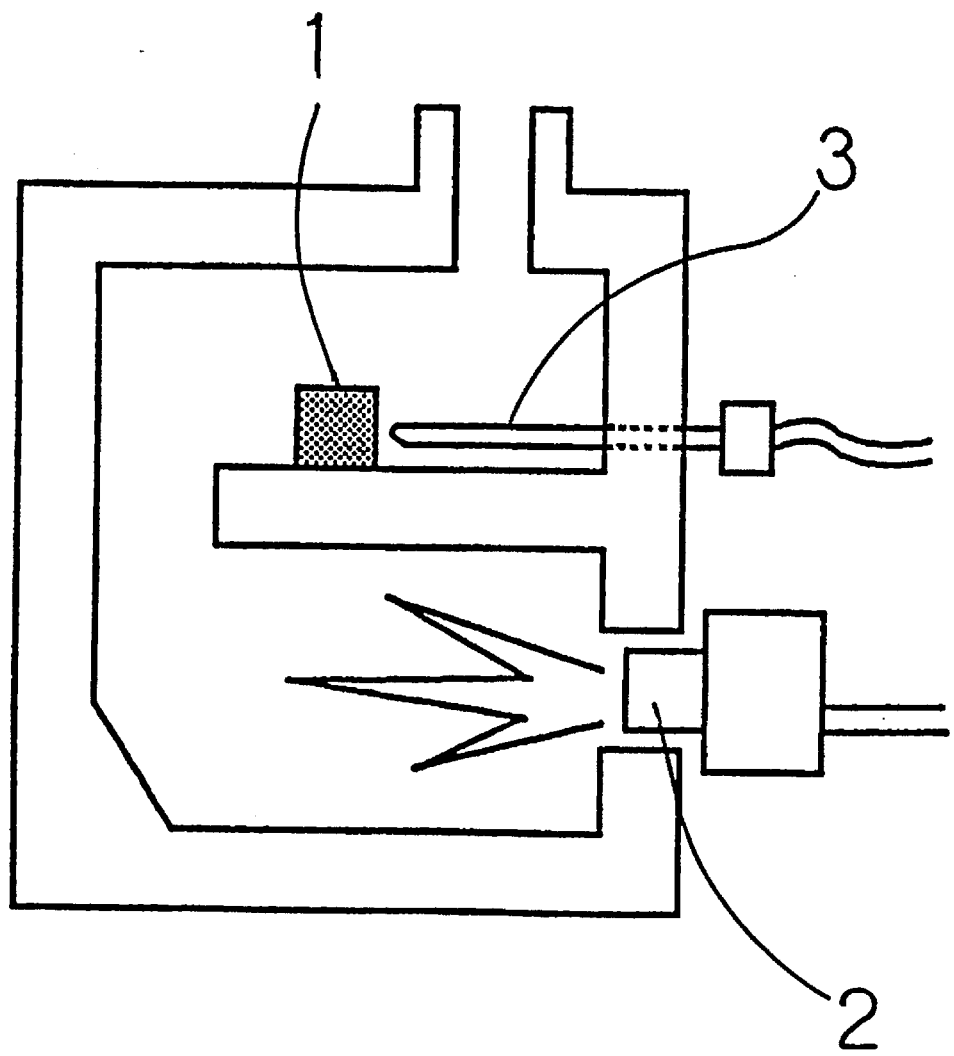
FIG. 1 is a diagram showing a cross section of a quick heating test furnace in which dry explosive resistance tests are to be conducted. A sample 1 is heated in the test furnace by means of a kerosene burner 2, and the temperature is measured by means of a thermocouple 3.

Examples of the present invention are explained hereinafter.

Seven examples were prepared. In the examples, as refractory aggregate powders, fused alumina having grain size of 10 to 1 mm, fused alumina having grain size of 1 mm or less, sintered alumina having grain size of 0.3 mm or less, silicon carbide having grain size of 0.3 mm or less, carbon and silica flour were used. These refractory aggregate powders were conventionally used. As a binder, phosphate glass, sodium citrate, sodium glycolate and aluminum lactate were used, and as a thickener, methylcellulose, carboxymethyl cellulose and isobutyl maleic anhydride copolymer were used.

Seven kinds of mixtures which comprised refractory aggregate powders, a binder and a thickener were prepared. Ingredients were added respectively in the amounts shown in Table of Examples 1–5 and Table of Examples 6 and 7. Subseqently, the mixtures were kneaded with water, respective amounts of which are also shown in the respective Table of Examples.

When the mixtures were kneaded with water, the amount of dust which was expected to rise at that time was to be measured, but dust did not rise. Then, each sample was made in the shape of a cylinder having a diameter of 100 mm and a length of 100 mm. With respect to each sample, workability was tested by means of a finger touch. Flow value was measured by means of flow table and flow cone device. The mixture was rammed into a flow cone, and the flow cone was dropped on the flow table 15 times for 15 seconds. Then, the diameter (mm) of a spread specimen surface was measured. Thermosetting was also tested by means of a finger touch, after each sample had been heated at 80° C. for five hours. Dry explosive resistance was tested in the quick heating test furnace shown in FIG. 1, while each sample was heated up to at 600° C. Furthermore, each sample was tested for how many days it would be preserved at normal temperature, and it was confirmed that each mixture was capable of being preserved more than 40 days. Also, each mixture was tested whether or not separation of liquid phase would occur when it was transported by means of trucks, and it was confirmed that separation of liquid phase did not occur in each mixture. Results of experiments are shown also in the respective Table of Examples.

Besides, two samples of conventional monolithic refractories were made, and comparative tests were carried out. At first, mixtures of refractories aggregate powders, aluminum powders and a hardener were made, as shown in the Table of Comparisons, and the mixtures were mixed with water. When the mixtures were mixed with water, dust rose, and the amount of dust, that is, 6.0 to 3.0 mg/m$^3$ of dust was measured. Results of experiments are shown in the Table of Comparisons. Workability was good. Thermosetting and dry explosive resistance were good. However, the samples could be preserved only for 12 hours or less, and separation occurred when the samples were transported.

EFFECT OF THE INVENTION

As seen in the examples, pouring materials of the monolithic refractories according to the present invention have excellent features. That is to say, the pouring materials have a good thermosetting property at more than 80° C., and the pouring materials are capable of being preserved for a long time. Furthermore, the pouring materials are not separated when being transported. In the present invention it is essential that the binder is used together with the thickener, whereby to prevent the grain size segregation and the liquid phase separation which used to occur in conventional pouring materials when being transported. The monolithic refractories according to the present invention have such good effect that they are preservable for more than 40 days, because of the ion blocking ability of the thickener.

As compared with the above, conventional pouring materials were generally hardened within one day after they have been mixed. It is no exaggeration to say that conventional pouring materials could not be preserved. Even if there were measures to delay the hardening of the conventional pouring materials, the grain size segregation or water separation occurred violently, after the pouring materials have been transported. Thus, there were the problems as mentioned with respect to conventional pouring materials.

The present inventors have succeeded in producing pouring materials of premix type which are capable of improving the working environment, which are capable of simplifying application of refractories, which are capable of saving labor, and which have the excellent properties that conventional pouring materials had. Besides, the monolithic refractories according to the present invention can be used in works to be carried out by means of transferring under pressure, pouring under pressure or vibration forming.

| TABLE OF EXAMPLES 1–5 | | | | | |
|---|---|---|---|---|---|
| | Example 1 | Example 2 | Example 3 | Example 4 | Example 5 |
| | (Amount % by weight) | | | | |
| - Materials - | | | | | |
| Fused alumina | 55 | 55 | 55 | 55 | 55 |
| Fused alumina | 31 | 31 | 31 | 31 | 20 |
| Sintered alumina | 10 | 10 | 10 | 10 | 6 |
| Silicon Carbide | | | | | 15 |
| Carbon | | | | | 2 |
| Silica flour | 4 | 4 | 4 | 4 | 2 |
| Dispersing agent | 0.05 | 0.05 | 0.05 | 0.05 | 0.05 |
| Phosphate glass | 0.5 | 1.2 | 0.3 | | |
| Sodium citrate | | | 0.5 | 0.5 | |
| Sodium glycolate | | | | | 0.05 |
| Aluminum lactate | | | | | |
| Methyl cellulose | 0.02 | 0.03 | 0.02 | | 0.03 |
| Carboxymethyl cellulose | 0.02 | | 0.02 | 0.03 | 0.02 |
| Isobutyl maleic anhydride copolymer | | | | 0.02 | |
| Aluminum powder | | | | | |
| Hardener (Alumina cement) | | | | | |
| Water | 6.1 | 6.3 | 6.1 | 6.1 | 6.4 |

TABLE OF EXAMPLES 1–5

|  | Example 1 | Example 2 | Example 3 | Example 4 | Example 5 |
|---|---|---|---|---|---|
|  | (Amount % by weight) | | | | |
| - Experiments - | | | | | |
| Workability | good | good | good | good | good |
| Flow value (mm) | 131 | 128 | 133 | 129 | 132 |
| Thermosetting | good | good | good | good | good |
| Dry explosive resistance | good | good | good | good | good |
| Dust | none | none | none | none | none |
| Preservation | good | good | good | good | good |
| Separation when transported | none | none | none | none | none |

TABLE OF EXAMPLES 6 and 7 & COMPARISONS

|  | Example 6 | Example 7 | Comparison 1 | Comparison 2 |
|---|---|---|---|---|
|  | (Amount % by weight) | | | |
| - Materials - | | | | |
| Fused alumina | 55 | 55 | 55 | 55 |
| Fused alumina | 20 | 20 | 31 | 20 |
| Sintered alumina | 6 | 6 | 10 | 6 |
| Silicon Carbide | 15 | 15 |  | 15 |
| Carbon | 2 | 2 |  | 2 |
| Silica flour | 2 | 2 | 4 | 2 |
| Dispersing agent | 0.05 | 0.05 | 0.05 | 0.05 |
| Phosphate glass |  | 0.3 |  |  |
| Sodium citrate | | | | |
| Sodium glycolate | | | | |
| Aluminum lactate | 0.5 | 0.5 | | |
| Methyl cellulose | | | | |
| Carboxymethyl cellulose | 0.02 | 0.02 | | |
| Isobutyl maleic anhydride copolymer | 0.02 | 0.02 | | |
| Aluminum powder |  |  | 0.5 | 0.5 |
| Hardener (Alumina cement) |  |  | 3.0 | 2.5 |
| Water | 6.2 | 6.2 | 3.9 | 4.3 |
| - Experiments - | | | | |
| Workability | good | good | good | good |
| Flow value (mm) | 135 | 127 | 149 | 154 |
| Thermosetting | good | good | good | good |
| Dry explosive resistance | good | good | good | good |
| Dust (mg/m$^3$) | none | none | 3.0–6.0 | 3.0–6.0 |
| Preservation | good | good | not good | not good |
| Separation when transported | none | none | occurred | occurred |

We claim:

1. Monolithic refractories comprising 100% by weight of refractory aggregate powders, and in addition thereto, based on the weight of said powders, 0.05 to 5% by weight of a binder selected from the group consisting of phosphate glass mainly composed of $P_2O_5$-$Al_2O_3$-$Na_2O$-$K_2O$, and hydroxycarboxylates and combinations of the phosphate glass and hydroxycarboxylates, and 0.01 to 1% by weight of a thickener, characterized in that said monolithic refractories have been kneaded with water or other kneading liquid, wherein the thickener is a cellulose compound or a copolymer of maleic anhydride and isobutylene, wherein hydroxycarboxylates are glycolate, tartrate, lactate and citrate, the metal of which is lithium, sodium, potassium or aluminum.

* * * * *